United States Patent [19]
Olbrich

[11] Patent Number: 5,664,143
[45] Date of Patent: Sep. 2, 1997

[54] METHOD AND APPARATUS FOR SORTING DISK ACCESS COMMANDS IN A ROTATIONAL POSITION QUEUE ACCORDING TO TIME DIFFERENCES BETWEEN THE COMMANDS

[75] Inventor: Aaron K. Olbrich, Morgan Hill, Calif.

[73] Assignee: International Business Machines Corporation, Armonk, N.Y.

[21] Appl. No.: 344,068

[22] Filed: Nov. 23, 1994

[51] Int. Cl.$^6$ .................................................. G06F 12/00
[52] U.S. Cl. ............................................................. 711/112
[58] Field of Search .................................... 395/439, 438, 395/441

[56] References Cited

U.S. PATENT DOCUMENTS

| | | | |
|---|---|---|---|
| 4,583,166 | 4/1986 | Hartung et al. | 395/250 |
| 5,345,561 | 9/1994 | Kato | 395/439 |
| 5,345,575 | 9/1994 | English et al. | 395/439 |
| 5,390,313 | 2/1995 | Yanai et al. | 395/439 |
| 5,463,758 | 10/1995 | Ottesen | 395/441 |

OTHER PUBLICATIONS

IBM, "Enhanced Disk Task Scheduling", IBM Technical Disclosure Bulletin, vol. 29, Nr. 5, pp. 1946–1948 Oct. 1, 1986.

Hwang et al., "New Disk Scheduling Algorithms for Reduced Rotational Latency", Proceedings of the Third International Symposium on Database Systems for Advanced Applications, pp. 395–402 1993.

*Primary Examiner*—Jack B. Harvey
*Assistant Examiner*—Sumati Lefkowitz
*Attorney, Agent, or Firm*—Merchant, Gould, Smith, Edell, Welter & Schmidt, P.A.

[57] ABSTRACT

A method and apparatus for sorting a rotational position queue without sensing the rotational position of a recording media in a disk drive. Commands are accepted into a rotational position queue. A first command is selected and assigned the physical address of the last requested block of the first command. Each of the remaining commands are assigned the physical addresses of their first requested block. The difference between the physical address associated with the first command and each of the other commands is computed. The address differences are converted into a corresponding time difference. A seek time is subtracted from each time difference and, for the unselected commands having a time difference less than zero, a modified time difference is calculated by adding a full revolution latency time. The time differences are sorted according to their magnitude to identify the command associated with the smallest time difference. This command is labeled as the next command which is then assigned as the first command after the first command is dequeued. After each first command is dequeued, the process is repeated to ascertain a new next command.

17 Claims, 3 Drawing Sheets

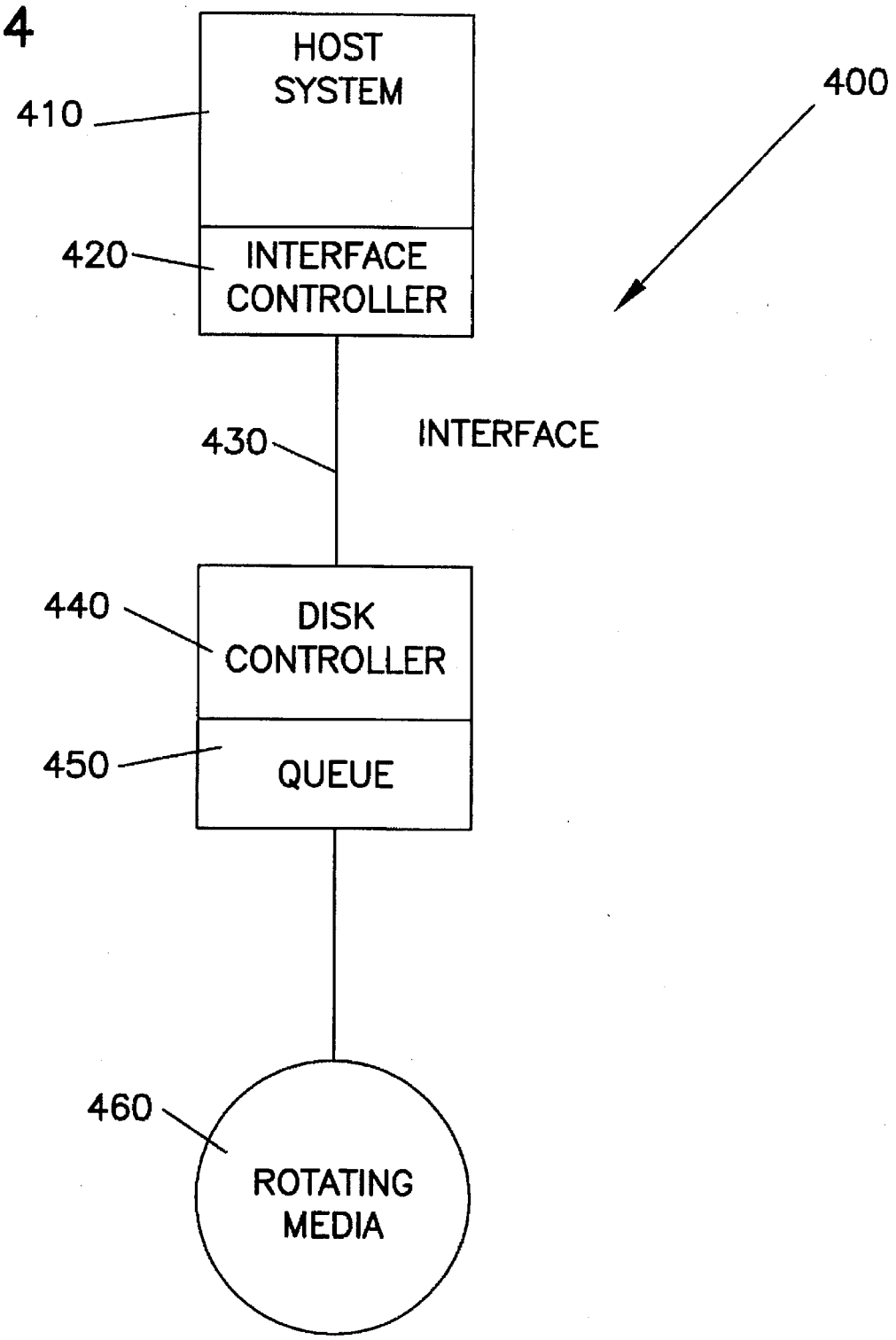

METHOD AND APPARATUS FOR SORTING DISK ACCESS COMMANDS IN A ROTATIONAL POSITION QUEUE ACCORDING TO TIME DIFFERENCES BETWEEN THE COMMANDS

BACKGROUND OF THE INVENTION

1. Field of the Invention

This invention relates in general to a method and apparatus for performing rotational position queue sorting without rotational position sense, and more particularly, to a method and apparatus for reordering commands in a rotational position queue based upon the relative positional relationship of the queued commands to a command assigned as the first command.

2. Description of Related Art

The reduction in the data retrieval time is a problem in the field of data storage systems. Further, a CPU central processing unit may generate so many disk drive commands within a small time interval that the commands cannot all be serviced immediately. This is especially true when the CPU is operating in a multi-tasking, multi-programming environment.

To address this problem and to minimize data retrieval times, sophisticated controllers have been developed to reorder the requests in a queue. For example, in OS/2 versions 1.0, 1.1, and 1.2, commands to a disk drive were ordered in an "elevator" sequence in which the commands are arranged in an associated service queue in a positional sequence designed to allow servicing of all enqueued requests having targeted storage locations reachable while the head of the disk drive is continuing in its present direction of motion. Other methods have focused on servicing the command which involves the smallest distance of head movement without regard to direction.

U.S. Pat. No. 5,313,585, issued May 17, 1994, to Jeffries et al., entitled "DISK DRIVE ARRAY WITH REQUEST FRAGMENTATION", incorporated herein by reference, discloses a method for performing multiple write operations within the smallest distance of head movement and lessened rotational latency. The disk drive includes a queue for access requests and each request is identified by its associated handle within a disk drive control system. Nevertheless, the disk drive manages requests serially and completes a request prior to starting the next request.

U.S. Pat. No. 5,220,653, issued Jun. 15, 1993, to Miro, entitled "SCHEDULING INPUT/OUTPUT OPERATIONS IN MULTITASKING SYSTEMS", incorporated herein by reference, discloses a method for performing multiple write operations on the basis of relative priority of tasks. The disk drive maintains a set of holding queues and an associated service queue for each physical drive in the system. Nevertheless, the commands in the services queue are serviced on a FIFO basis.

U.S. Pat. No. 5,239,640, issued Aug. 24, 1993, to Froemke et al., entitled "DATA STORAGE SYSTEM AND METHOD INCLUDING DATA AND CHECKSUM WRITE STAGING STORAGE", incorporated herein by reference, discloses an outboard data storage system for a data processing system including a plurality of data DASD's and a dedicated checksum DASD. The controller blocks data with contiguous addresses into single write commands and queues the write commands in an order corresponding to physical DASD addresses. However, this system is directed to providing a large write staging area on the order of 8 megabytes to streamline data throughput rather than to data queuing techniques.

U.S. Pat. No. 4,583,166, issued Apr. 15, 1986, to Hartung et al., entitled "ROLL MODE FOR CACHED DATA STORAGE", incorporated herein by reference, discloses creating a set of chained commands for accessing record areas to provide more rapid accessing a plurality of records. The command within the chain, irrespective of its location, having the closest logical rotational proximity to the instant rotational position of the surfaces is selected as the first command in the chain. The chain is executed beginning at the indicated rotational position selected command through the end of the chain and then wrapped to the beginning of the original chain and continuing on until the command immediately preceding the rotational position selected command has been executed. Nevertheless, the rotational position of the surfaces must first be determined. Further, the method is limited to accessing the records on a given cylinder of tracks. Further, more recent commands are not entered into the chain and therefore must wait until the processing of the chain is complete.

In summary, the reordering of commands based on rotational position has previously required first ascertaining the rotational position of the disk surfaces. However, this has posed a problem since the position of the surface changes while the position is being calculated. Further, in some drives, the calculation or estimation of the rotational position of the disk surfaces is not possible.

Therefore, it can be seen that there is a need for a method and apparatus for sorting rotational positional queues without first determining the position of the surface or surfaces.

It can also be seen that there is a need for a method and apparatus for sorting rotational positional queues that is not limited to record areas within a given track or within a given cylinder of tracks.

Finally, it can also be seen that there is a need for a method and apparatus for sorting rotational positional queues on a continual basis therefore integrating more recently received commands into the queue.

SUMMARY OF THE INVENTION

To overcome the limitations in the prior art described above, and to overcome other limitations that will become apparent upon reading and understanding the present specification, the present invention discloses a method and apparatus for reordering commands based on rotational position without sensing the rotational position of the disk surfaces.

The present invention solves the above-described problems by determining the relationship between a reference command and each of the remaining queued commands.

A system in accordance with the principles of the present invention comprises means for accepting a plurality of commands into a rotational position queue. The command in the front of the queue is selected as a first command. Then an associated time difference is calculated for each unselected command. The time difference is the time difference between the first command and the unselected commands. The time differences are sorted in order of their magnitude to identify a next command, which is the command associated with the smallest time difference. Thereafter, the next command is assigned as the first command after the first command is dequeued. The process is then repeated to identify a new next command.

One aspect of the present invention is that a rotational position queue is sorted without needing to sense the rotational position of the disk surfaces.

Another aspect of the present invention is that commands are reordered based upon their positional relationship to the first command in the queue.

Another aspect of the present invention is that a disk drive schedules commands in a multitasking processing system based upon the relative position of requested blocks.

Yet another aspect of the present invention is that the throughput of multiple video and multiple audio streams in multimedia systems is increased.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout:

FIG. 4 is a block diagram of a system according to the present invention.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Figure 1:
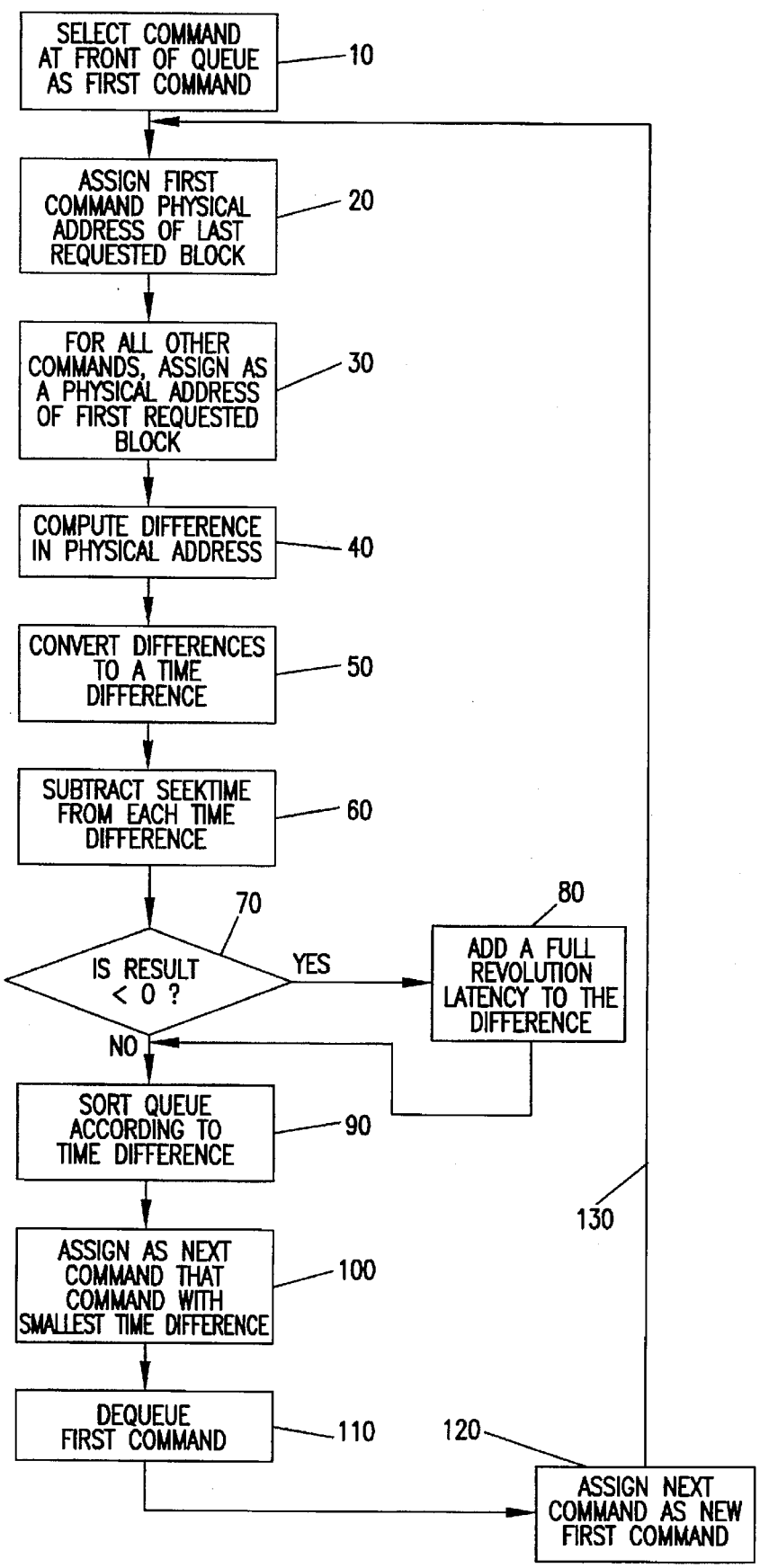
FIG. 1 is a flow chart of the rotational position queue sorting method according to the present invention.

FIG. 1 illustrates a flow diagram of the operation of the rotational position queue sorting method according to the present invention. The method provides sorting of the rotational position queue without sensing the rotational position of a recording media. First, a plurality of commands are accepted into a rotational position queue. The command in the front of the queue is selected as the first command 10 and the first command is assigned a physical address 20.

The physical address for the first command is the physical address of the last requested block of the first command 20. Each of the unselected commands is also assigned a physical address 30. The physical address for each of the unselected commands is the physical address of their first requested block 30. Then, the differences between the first physical address and the second physical addresses are computed 40.

The address differences are each converted to a corresponding time difference 50. This time difference is based upon the rotational speed of the recording media. Then a seek time from each command is subtracted from the associated time difference 60. For the unselected commands having a time difference less than zero 70, a modified time difference is determined by adding 80 a full revolution latency time. The time differences are sorted 90 according to their magnitude to identify a next command. The next command is that command associated with the smallest time difference 100. After the first command is dequeued 110, the next command is assigned as the first command 120. The steps are then repeated 130 to determine a new next command.

Figure 2:
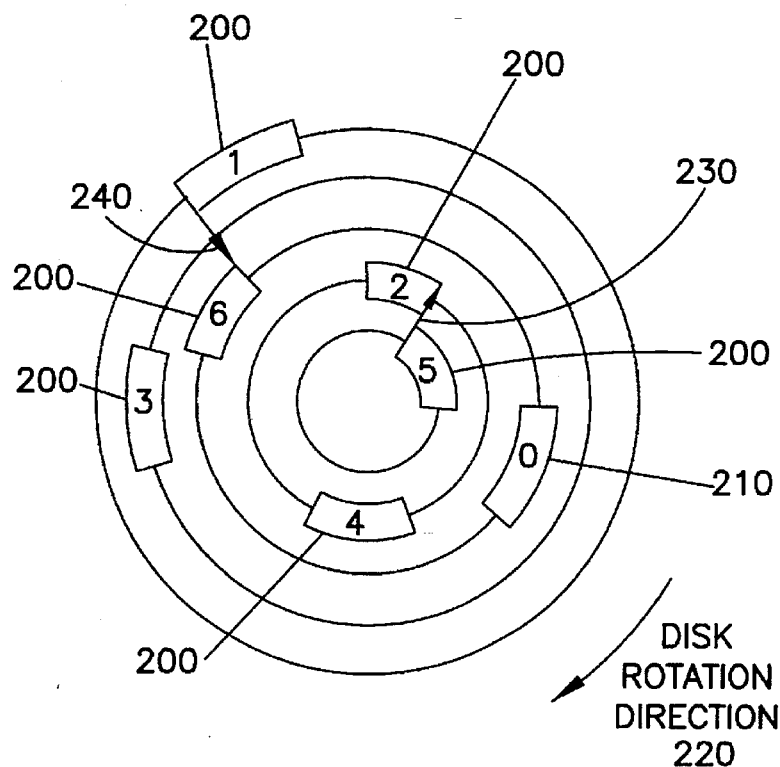
FIG. 2 is a diagram illustrating the operation of the rotational position queue sorting method.

FIG. 2 illustrates a disk having several blocks identified with a series of commands. The number associated with each block 200 reflects the order the commands were received by the rotational position queue. The block identified as block zero 210 represents the command currently being executed. In FIG. 2, the disk is assumed to be rotating in a clockwise manner 220. Arrows 230, 240 represent transitions which cannot occur without requiring an additional disk revolution since the head cannot move to the position before at least a portion of the block has rotated past the head. Thus, the seek time is too long.

Figure 3:
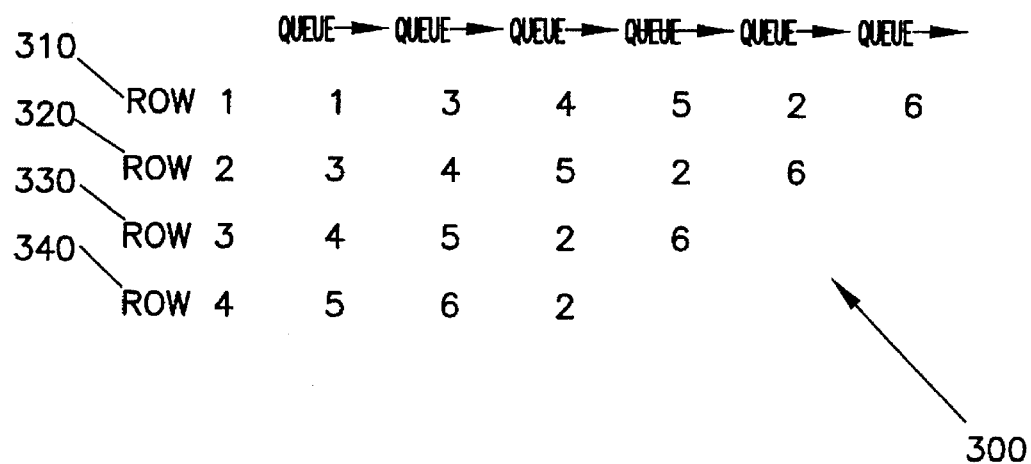
FIG. 3 is a chart illustrating the sorting of the rotational position queue with reference to the commands shown in FIG. 2.

FIG. 3 is a chart 300 illustrating the contents of the rotational position queue for the commands referenced in FIG. 2. As mentioned with reference to FIG. 2 above, the commands in the queue are initially in sequential order. Block one is selected as the first command. Row one 310 reflects the order of the commands after the completion of one sorting operation.

The order prior to subtraction of the seek time would be as follows: block one, block six, block three, block four, block five, and block two. However, after the seek times are subtracted from the time differences, a full revolution latency time must be added to block six since the seek time is greater than the time difference (time difference minus seek time being less than zero). Since, the head of the disk drive cannot switch sufficiently quick to reach block six, the next command will be block three. Next will be block four, followed by block five and block two. With the addition of a full revolution latency time added, block six will follow. Thus, block three becomes the next command.

When the command associated with block one is dequeued, block three becomes the first command. The process is repeated with reference to block three. The time difference for the remaining commands in the queue will then be block four, block five, block two, and block six. Thus, block four becomes the next command. This is represented in row two 320 of FIG. 3.

When the command associated with block three is dequeued, block four becomes the first command. The process is repeated with reference to block four. The sorted time difference for the remaining commands in the queue will then be block five, block two, and block six. Thus, block five becomes the next command. This is represented in row three 330 of FIG. 3.

When the command associated with block four is dequeued, block five becomes the first command. The process is repeated with reference to block five. The sorted time difference for the remaining commands in the queue will then be block six and block two. This is because after the seek times are subtracted from the time differences, a full revolution latency time must be added to block two since the seek time is greater than the time difference (time difference minus seek time being less than zero). Since, the head of the disk drive cannot switch sufficiently quick to reach block two, the next command will be block six. Thus, block six becomes the next command. This is represented in row four 340 of FIG. 3.

Finally, FIG. 4 illustrates a block diagram of a computer disk drive system in accordance with the invention 400. A host computer system 410 is coupled to an interface controller 420. The interface controller 420 is attached to an interface 430 linking the host system 410 to a disk controller 440. The disk controller 440 is attached at the opposite end of the interface 430 and receives commands across the interface 430 from the host system 410.

In FIG. 4, the disk controller is shown as being part of the disk drive system. However, those skilled in the art will recognize that the disk controller may be provided for apart from the disk drive system. For example, the disk controller could be provided as a part of the host system.

The disk controller 440 is coupled to a queue 450. The disk controller 440 places the commands from the host system 410 in the queue 450 for execution or access to the rotating media 460. The disk controller 440 then controls the sorting of the commands in the queue 450 according to the steps discussed above with reference to FIG. 1.

Accordingly, the rotational position queue is sorted without needing to sense the rotational position of the disk surfaces and the commands are reordered based upon their positional relationship to the first command in the queue.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for sorting a rotational position queue of a disk drive without sensing the rotational position of a recording media in the disk drive, comprising the steps of:

a. accepting a plurality of commands into a rotational position queue, each command comprising a first and last block of data, the first and last block of data having an address;

b. selecting a command in the queue as a first command;

c. assigning the first command a first physical address, the first physical address being the address of the last requested block of the first command;

d. assigning each unselected command a second physical address, the second physical address being the address of the first requested block of the unselected command;

e. calculating for each unselected command an associated time difference, the time difference being the time required to move from the first physical address to the second physical address;

f. sorting the time differences in order of magnitude to identify a next command, the next command having the smallest time difference;

g. assigning the next command as the first command after the first command is dequeued;

h. loading into the queue new commands; and i. repeating steps (c)–(h).

2. The method of claim 1 further comprising the steps of:
   subtracting a seek time from each calculated time difference; and
   determining a modified time difference by adding a full revolution latency time to the calculated time differences of the unselected commands having a time difference less than zero.

3. The method of claim 1 wherein the calculating step further comprises the steps of:
   subtracting a seek time from each time difference; and
   determining a modified time difference by adding a full revolution latency time to the calculated time differences for the unselected commands having a time difference less than zero.

4. The method of claim 1 wherein the calculating step further comprises the steps of:
   computing the difference between the first physical address and the second physical addresses; and
   converting the address differences to a corresponding time difference representing the time differences.

5. The method of claim 3 wherein the time difference is based upon the rotational speed of recording media.

6. A method for sorting a rotational position queue without sensing the rotational position of a recording media in a disk drive, comprising the steps of:

a. accepting a plurality of commands into a rotational position queue, each command comprising a first and last block of data having an address;

b. selecting a command in the queue as a first command;

c. assigning the first command a first physical address, the first physical address being the address of the last requested block of the first command;

d. assigning the unselected commands second physical addresses, the second physical addresses being the address of the first requested block of the unselected commands;

e. computing the difference between the first physical address and the second physical addresses;

f. converting the address differences to a corresponding time difference, the time difference being based upon the rotational speed of the recording media;

g. subtracting a seek time from each time difference;

h. determining a modified time difference by adding a full revolution latency time to the time differences for the unselected commands having a time difference less than zero;

i. sorting the time differences in order of magnitude to identify a next command, the next command being the command associated with the smallest time difference;

j. assigning the next command as the first command after the first command is dequeued; and k. repeating steps (a)–(j).

7. A disk controller connected to the positional head assembly for controlling the position of the head to read and write data to a storage disk, the disk controller comprising:
   a rotational position queue for accepting a plurality of commands, each command comprising a first and last block of data having an address;
   means for selecting a command in the queue as a first command;
   first assignment means for assigning the first command a first physical address, the first physical address being the address of the last requested block of the first command;
   second assignment means for assigning the unselected commands second physical addresses, the second physical addresses being the address of the first requested block of the unselected commands;
   means for calculating for each unselected command an associated time difference, the time difference being the time required to move from the first physical address to the second physical address;
   a sorter for arranging the time differences in order of magnitude to identify a next command, the next command having the smallest time difference; and means for assigning the next command as the first command after the first command is dequeued.

8. The disk controller of claim 7 wherein the means for calculating further comprises:
means for subtracting a seek time from each calculated time difference; and
means for computing a modified time difference by adding a full revolution latency time to the calculated time differences of the unselected commands having a time difference less than zero.

9. The disk controller of claim 7 wherein the means for calculating further comprises:
means for subtracting a seek time from each time difference; and
means for computing a modified time difference by adding a full revolution latency time to the calculated time differences for the unselected commands having a time difference less than zero.

10. The disk controller of claim 7 wherein the means for calculating further comprises:
means for computing the difference between the first physical address and the second physical addresses; and
a convertor for converting the address differences to a corresponding time difference representing the time differences.

11. The disk controller of claim 10 wherein the time difference is based upon the rotational speed of recording media.

12. A disk drive system, comprising:
at least one storage disk,
means for rotating the storage disk,
a positional head assembly; and
a disk controller connected to the positional head assembly for controlling the position of the head to read and write data to the storage disk, the disk controller comprising:
a rotational position queue for accepting a plurality of commands, each command comprising a first and last block of data having an address;
means for selecting a command in the queue as a first command;
first assignment means for assigning the first command a first physical address, the first physical address being the address of the last requested block of the first command; and
second assignment means for assigning the unselected commands second physical addresses, the second physical addresses being the address of the first requested block of the unselected commands;
means for calculating for each unselected command an associated time difference, the time difference being the time required to move from the first physical address to the second physical address;
a sorter for arranging the time differences in order of magnitude to identify a next command, the next command having the smallest time difference; and
means for assigning the next command as the first command after the first command is dequeued.

13. The disk drive system of claim 12 further comprising:
means for subtracting a seek time from each calculated time difference; and
means for determining a modified time difference by adding a full revolution latency time to the calculated time differences of the unselected commands having a time difference less than zero.

14. The disk drive system of claim 12 wherein means for calculating further comprises:
means for subtracting a seek time from each time difference; and
means for computing a modified time difference by adding a full revolution latency time to the calculated time differences for the unselected commands having a time difference less than zero.

15. The disk drive system of claim 12 wherein the means for calculating further comprises:
means for computing the difference between the first physical address and the second physical addresses; and
a convertor for converting the address differences to a corresponding time difference representing the time differences.

16. The disk drive system of claim 15 wherein the time difference is based upon the rotational speed of recording media.

17. A disk drive array storage device, comprising:
an interface means connected to a host computer system for receiving and transmitting data;
a plurality of spindles having at least one disk storage device mounted thereon;
a disk controller connected to the interface means for controlling read and write commands to the at least one disk storage device, the disk controller comprising:
a rotational position queue for accepting a plurality of commands, each command comprising a first and last block of data having an address;
means for selecting a command in the queue as a first command;
first assignment means for assigning the first command a first physical address, the first physical address being the address of the last requested block of the first command;
second assignment means for assigning the unselected commands second physical addresses, the second physical addresses being the address of the first requested block of the unselected commands;
means for calculating for each unselected command an associated time difference, the time difference being the time required to move from the first physical address to the second physical address;
a sorter for arranging the time differences in order of magnitude to identify a next command, the next command having the smallest time difference; and
means for assigning the next command as the first command after the first command is dequeued.

* * * * *